United States Patent
Shipman

[15] 3,685,293
[45] Aug. 22, 1972

[54] EXHAUST CONTROL FOR ENGINES
[72] Inventor: Herbert C. Shipman, 935 E. Normae, Springfield, Mo. 65804
[22] Filed: May 13, 1970
[21] Appl. No.: 36,902

[52] U.S. Cl. ............60/229, 239/265.25, 239/265.27
[51] Int. Cl. ............................F02k 1/10, F02k 1/20
[58] Field of Search ...60/229, 228, 226; 239/265.25, 239/265.27

[56] References Cited

UNITED STATES PATENTS

| | | | |
|---|---|---|---|
| 3,302,889 | 2/1967 | Di Sabato | 60/229 X |
| 2,968,149 | 1/1961 | Graham | 60/228 |
| 3,333,772 | 8/1967 | Bruner | 60/226 X |
| 1,714,917 | 5/1929 | Martin | 60/229 X |
| 1,393,977 | 10/1921 | Saul | 60/229 |
| 3,055,175 | 9/1962 | Clark | 60/229 X |
| 3,069,850 | 12/1962 | Ledwith | 60/229 |
| 3,143,852 | 8/1964 | Alderson | 60/229 X |
| 3,154,916 | 11/1964 | Eichholtz | 60/228 |

*Primary Examiner*—Clarence R. Gordon
*Attorney*—Clarence A. O'Brien and Harvey B. Jacobson

[57] ABSTRACT

Exhaust gases discharged from a jet engine are conducted through an exhaust control tube mounting funnel blades displaceable from an inactive position to a passage converging position to increase thrust. A flow deflecting disc mounted downstream of the funnel blades directionally affects thrust or impedes flow for a braking effect. Passages circumferentially spaced about the discharge end of the exhaust control tube, vent the exhaust gas while the flow deflecting disc is in the braking position.

10 Claims, 4 Drawing Figures

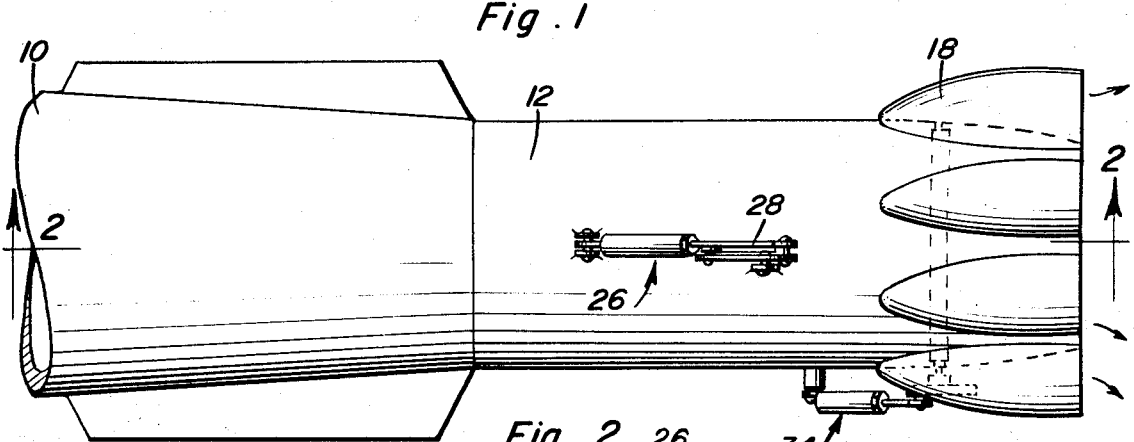
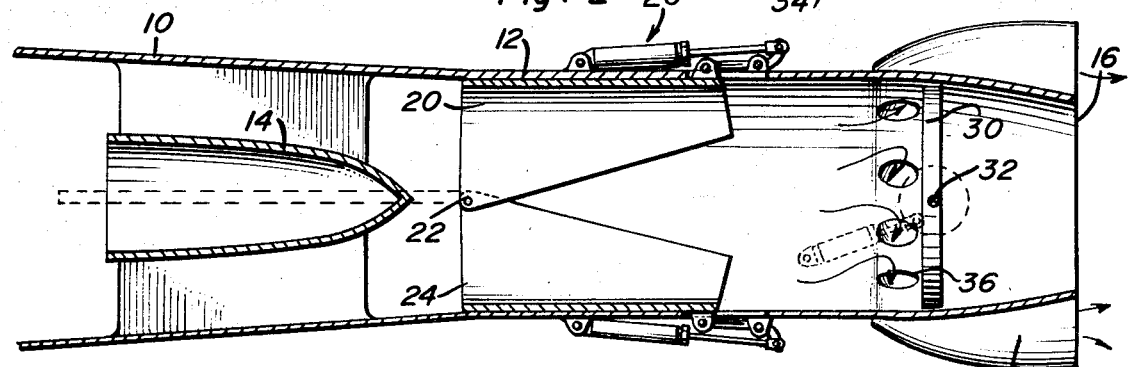
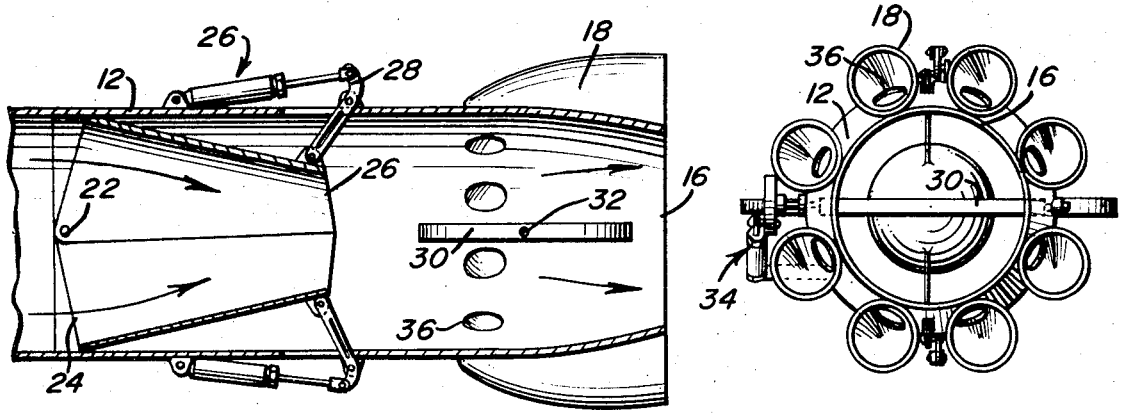
Herbert C. Shipman
INVENTOR.

EXHAUST CONTROL FOR ENGINES

This invention relates to reaction thrust or jet engines and more particularly to an improvement thereto for controlling the outflow from the exhaust end of the engine.

A major portion of the power developed by a jet engine is delivered as propelling thrust by discharge of exhaust gas from its rear end. Although thrust is produced in an efficient manner by such engines during aircraft flight at relatively high speeds, there is a considerable amount of power loss during take-off and landing. It is therefore an important object of the present invention to provide an exhaust control system for jet engines whereby the thrust developed by such engines for aircraft may be more efficiently utilized during take-off and landing.

In accordance with the present invention, an exhaust control system is utilized whereby take-off in shorter distances is made possible without reliance on aileron control. Further, a more rapid reduction in speed for landing purposes is made possible. These objectives are achieved by rearwardly extending the discharge end of the jet engine so as to enclose a pair of funnel blades displaceable between an inactive position lying against the walls of the extended jet engine tailpipe to a position defining a converging passage through which the exhaust gas is conducted to increase its speed and reaction thrust. A flow deflecting disc member is also pivotally mounted downstream of the funnel blades for upwardly or downwardly deflecting discharge of exhaust gas from the tailpipe of the jet engine when the disc member is in flow directing positions. The disc member may also be pivotally displaced to a flow blocking position for braking purposes. In this braking position, exhaust gas escapes through a plurality of circumferentially spaced vent passages having inlet ends closely spaced upstream of the disc member in its flow blocking position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top elevational view of the rear section of a jet engine constructed in accordance with the present invention.

FIG. 2 is a sectional view taken substantially through a plane indicated by section line 2—2 in FIG. 1.

FIG. 3 is a sectional view similar to FIG. 2 but showing the engine in another operative condition.

FIG. 4 is a rear elevational view of the engine shown in FIG. 1.

Referring now to the drawings in detail, the rear end section of the tubular housing 10 associated with any conventional jet engine is shown. This rear end section is longitudinally extended by a control tube 12 through which exhaust gases are conducted from the engine past the conical fairing 14 for discharge from the exit end 16 of the control tube. Mounted on the control tube and extending a short distance from its exit end 16 are a plurality of circumferentially spaced vent tubes 18. The vent tubes project radially from the control tube and are streamlined in external shape. Exhaust gases are vented from the control tube through the vent tubes during braking operation as will be explained hereafter.

A nozzle assembly in the form of a pair of funnel blades 20, is mounted within the control tube 12 closely spaced downstream of the conical fairing 14. The funnel blades are pivotally interconnected and mounted for pivotal displacement about an axis perpendicular to the direction of flow by means of a pivot assembly 22. When the funnel blades are in an active position as shown in FIG. 3, they enclose a converging conical passage having a large diameter end 24 substantially equal to the internal diameter of the control tube and a small diameter end 25. Thus, the exhaust gases when conducted through the funnel blades in the active position, will increase in velocity and thereby produce an increased thrust. In the inactive position as illustrated in FIG. 2, the funnel blades are positioned against the internal walls of the control tube 12 so as to have little effect on the flow of exhaust gases through the control tube. Any suitable power operated means may be employed for displacing the funnel blades between their active, flow converging positions and their inactive positions spaced from each other. For example, fluid operated cylinder devices 26 may be pivotally anchored to the control tube and connected through actuating linkages 28 to the downstream end of the funnel blades.

The funnel blades in the active positions illustrated in FIG. 3, will be effective to increase the thrust produced by the jet engine as aforementioned for take-off purposes. Flow of the exhaust gases from the funnel blades may be deflected downwardly for example by means of a flow deflecting, planar disc member 30 in order to reduce the take-off distance of the aircraft on which the engine is mounted. The disc member may therefore be displaced somewhat from the horizontal position shown in FIG. 3 and is accordingly pivotally mounted within the control tube downstream of the funnel blades 20 by means of a pivot assembly 32 establishing a pivotal axis parallel to the axis extending through the pivot assembly 22 associated with the funnel blades. Any suitable fluid operated means 34 may be mounted on the control tube and operatively connected to the pivot assembly 32 for the flow deflecting disc member 30 in order to control its position.

It will be noted from FIG. 3, that in the flow deflecting positions of the disc member 30, it extends upstream of the inlet ends 36 through which fluid communication is established between the vent tubes 18 and the interior of the control tube 12. Thus, the flow of exhaust gases will be directed by the disc member 30 past the inlet ends 36 of the vent tubes. However, the inlet ends 36 of the vent tubes will be located closely upstream of the disc member 30 when it is displaced to its flow blocking as illustrated in FIG. 2. In this position of the disc member 30, an effective braking action is produced by preventing development of reaction thrust as a result of the high velocity discharge of exhaust gases from the exit end 16 of the control tube. The exhaust gases will instead be vented to atmosphere through the vent tubes 18.

It will be apparent from the foregoing, that a jet engine having the exhaust control system of the present invention will not be materially affected when the funnel blades 20 are in their inactive positions as shown in FIG. 3 and the disc member 30 is in a horizontal position as shown in FIG. 2. For landing purposes, the output thrust of the engine may be increased by displacing the funnel blades 20 to the flow converging position and directed downwardly by slightly displacing the disc member 30 from its horizontal position in a clockwise direction as viewed in FIG. 3. This will enhance rapid elevation of the aircraft. Similarly, more rapid descent may be obtained by displacing the disc member 30 in a counterclockwise portion. A rapid reduction in speed on the other hand for landing purposes may be obtained by displacing the disc member 30 to its vertical, flow blocking position while the funnel blades are in the inactive positions as shown in FIG. 2. It should also be appreciated that any suitable power operated means may be employed to controllably position the blades 20 and disc member 30 such as the fluid piston devices 26 and 34 illustrated. Suitable housing mounted enclosures for the devices 26 and 34 would of course be provided to avoid turbulence and damage by air friction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a reaction thrust engine having an end portion from which exhaust gas is discharged, thrust control means connected to said end portion comprising an exhaust control tube having an exit end through which the exhaust gas is conducted to atmosphere, nozzle means mounted in the control tube for movement between an inactive position and an active position increasing the thrust of the exhaust gas conducted therethrough, flow deflecting means mounted within the control tube spaced upstream from the exit end for substantially blocking flow downstream of the nozzle means and vent passage means in fluid communication with the control tube downstream of the nozzle means for conducting flow rearwardly while flow through the control tube is blocked.

2. The combination of claim 1 wherein said nozzle means includes a pair of funnel blades spaced from each other in the inactive position internally lining the control tube and enclosing a converging passage therebetween in the active position.

3. The combination of claim 2 wherein said flow deflecting means includes a planar disc member having a surface substantially blocking flow through the control tube in a braking position and extending upstream of the vent passage means in a flow directing position.

4. The combination of claim 3 includes means for pivotally mounting the funnel blades and the disc member about axes perpendicular to the direction of flow through the control tube.

5. The combination of claim 4 wherein said vent passage means comprises a plurality of vent tubes mounted in circumferentially spaced relation to the control tube having inlet ends closely spaced upstream of the flow deflecting means in the braking position.

6. The combination of claim 1 wherein said flow deflecting means includes a planar disc member having a surface substantially blocking flow through the control tube in a braking position and extending upstream of the vent passage means in a flow directing position.

7. The combination of claim 6 wherein said vent passage means comprises a plurality of vent tubes mounted in circumferentially spaced relation to the control tube having inlet ends closely spaced upstream of the flow deflecting means in the braking position.

8. The combination of claim 1 wherein said vent passage means comprises a plurality of vent tubes mounted in circumferentially spaced relation to the control tube having inlet ends closely spaced upstream of the flow deflecting means in a braking position.

9. In combination with a reaction thrust engine having an end portion from which exhaust gas is discharged, thrust control means connected to said end portion comprising an exhaust control tube having an exit end through which the exhaust gas is conducted to atmosphere, means mounted in the control tube for increasing the thrust of the exhaust gas conducted therethrough, flow deflecting means mounted within the control tube for movement between flow directing positions and a flow blocking position, and vent passage means in fluid communication with the control tube closely upstream of the flow deflecting means in the flow blocking position thereof.

10. The combination of claim 9 wherein said flow deflecting means includes a movable disc member peripherally dimensioned substantially cross-sectionally equal to the control tube adjacent the exit end and extending upstream of the vent passage means in the flow directing positions.

* * * * *